United States Patent [19]

Yamada et al.

[11] Patent Number: 4,896,876
[45] Date of Patent: Jan. 30, 1990

[54] DOCUMENT FEEDING APPARATUS

[75] Inventors: Yasushi Yamada; Masaru Ushio; Yoshikazu Maekawa; Tsugio Hirabayashi, all of Tokyo, Japan

[73] Assignee: Konica Corporation, Tokyo, Japan

[21] Appl. No.: 207,848

[22] Filed: Jun. 17, 1988

[30] Foreign Application Priority Data

Jun. 22, 1987 [JP] Japan ................. 62-154639

[51] Int. Cl.$^4$ .............................. B65H 7/02
[52] U.S. Cl. ..................... 271/265; 271/266; 355/316
[58] Field of Search ............. 271/10, 35, 256, 258, 271/259, 265, 266; 355/14 SH, 316

[56] References Cited

U.S. PATENT DOCUMENTS

| | | | |
|---|---|---|---|
| 3,114,902 | 12/1963 | Tanguy | 271/259 |
| 3,988,017 | 10/1976 | Kyhl | 271/259 |
| 4,310,153 | 1/1982 | Kikuchi | 271/259 |
| 4,331,328 | 5/1982 | Fasig | 271/259 |

FOREIGN PATENT DOCUMENTS

| | | | |
|---|---|---|---|
| 6858 | 1/1983 | Japan | 271/256 |
| 119533 | 7/1983 | Japan | 271/256 |

Primary Examiner—H. Grant Skaggs
Attorney, Agent, or Firm—Finnegan, Henderson, Farabow, Garrett and Dunner

[57] ABSTRACT

A document feeding apparatus wherein documents are fed one by one from a document stacker by a first document feeding device and a second document feeding device which is provided in the midway of a path from the first document feeding device to a processing unit, and the movement of the document is stopped temporarily by a document stopping device before the leading end of the document fed from the second document feeding device reaches a synchronous sensor provided in the midway of a path from the second document feeding device to the processing unit. The first document feeding device consists of a feeding belt connected to a drive source through an electromagnetic clutch, and a separating roller which is in sliding contact with an upper surface of the feeding belt in a non-rotary state. The second document feeding device consists of a drive roller connected to a drive source through an electromagnetic clutch, and a driven roller which is press contact with the drive roller.

6 Claims, 5 Drawing Sheets

DOCUMENT FEEDING APPARATUS

BACKGROUND OF THE INVENTION

1. Field of the Invention

The present invention relates to a document feeding apparatus for feeding documents stacked on a document stacker one by one onto a document glass plate and returning the documents onto the document stacker after an exposing processing so as to feed repeatedly the documents to the document glass plate.

2. Description of the Prior Art

There are two kinds of document feeding apparatuses, one is an ADF wherein documents stacked on a document stacker are separated and fed one by one onto a document glass plate, and discharged to an outside discharge tray after an exposing process for the documents on said document glass plate. The other is an RDF wherein documents stacked on a document stacker are separated and fed one by one onto a document glass plate, and returned onto the document stacker after an exposing processing for the documents on the document glass plate so that the documents can be fed repeatedly to the document glass plate.

In such document feeding apparatus the separating ability of the document feeding means is very important. A bottom feed system has been adopted as a system having a good separating ability. In such system, the documents are separated one by one by using suction or by using friction. The latter has advantages over the former in that in that it is low in the manufacturing cost, small in size and simple in adjustment and maintenance thereof.

FIG. 5 shows a conventional document feeding apparatus equipped with a document feeding device of frictional separating system as mentioned above. In FIG. 5, reference numeral 170 denotes a document stacker, 171 denotes a first document feeding means provided adjacent to said document stacker 170 for separating by friction documents stacked on said document stacker 170 one by one, and 174 denotes a second document feeding means provided in a path 173 communicating said first document feeding means 171 with a processing unit 172.

Said first document feeding means 171 consists of a feeding belt 171a driven by a drive source (not shown) through an electromagnetic clutch MC1, and a separating roller 171b which is in sliding contact with an upper surface of said feeding belt 171a in a non-rotary state, so that a sheet of documents at the lower most layer which is in direct contact with the feeding belt 171a can be separated by friction and fed when the feeding belt 171a is rotated in a feeding direction under such a state that the leading ends of the documents located on the feeding belt 171a are prevented from being moved by the separating roller 171b.

Said feeding belt 171a is stopped when the leading end of the forwarded document has passed through said second document feeding means 174 and reaches a synchronous sensor 175, but the trailing end of the document has not yet passed through a press contact point (a) formed between said separating roller 171b and said feeding belt 171a, so that the next sheet of documents is prevented from flying. The feeding of the documents to the processing unit 172 is continued by said second document feeding means 174. At the processing unit 172, an exposure is initiated after a predetermined time has lapsed from a time at which the leading end of said sheet of documents has passed through said synchronous sensor 175.

In the above apparatus, however, the frictional separation of the documents is carried out under the state that the leading ends of the documents are prevented from being forwarded by said separating roller 171b, so that the forwarding power is not so large and accordingly a time required for reaching the leading end of the document to said sensor 175 may be varied due to the stiffness of the document or the amount of the documents stacked on the document stacker 170. Accordingly, the distance between the documents becomes uneven so that jamming occurs and the duration of time between the detection of the leading end of the document by the sensor 175 and the initiation of the exposure are fluctuates.

SUMMARY OF THE INVENTION

An object of the invention is to provide a document feeding apparatus wherein a duration of time between the detection of the leading end of a document by a synchronous sensor and the initiation of an exposure is prevented from fluctuating irrespective of the stiffness of the document or the number of documents stacked on the stacker.

The above object can be attained by a document feeding apparatus comprising a first document feeding means for feeding documents one by one from a document stacker, a second document feeding means provided in the midway of a path from said first document feeding means to a processing unit, and a synchronous sensor provided in the midway of a path from said second document feeding means to said processing unit, wherein document stopping means for stopping temporarily the movement of the document before the leading end of said document fed from said second document feeding means reaches the synchronous sensor is provided, so that the document of which leading end actuates the synchronous sensor can be fed to an exposing position by the second document feeding means having a stable document feeding power.

Other objects and features of the present invention will become apparent from the following description taken with reference to the accompanying drawings.

DESCRIPTION OF THE PREFERRED EMBODIMENTS

Figure 1:
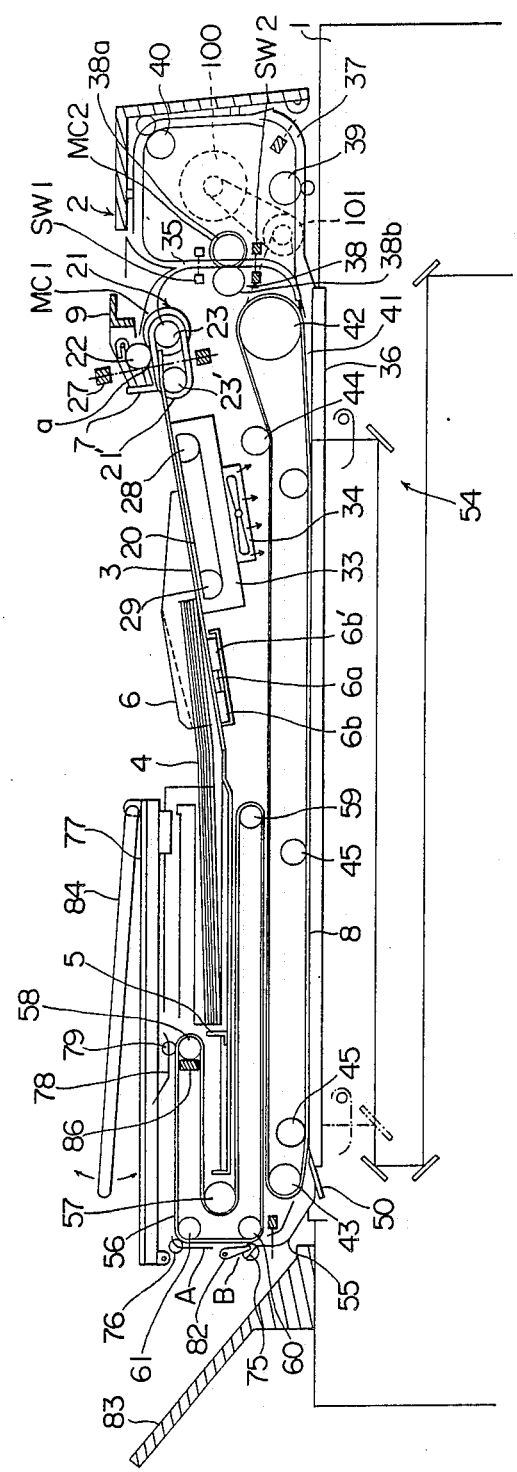
FIG. 1 is a sectional front elevation showing a document feeding apparatus of the present invention.
Figure 2:
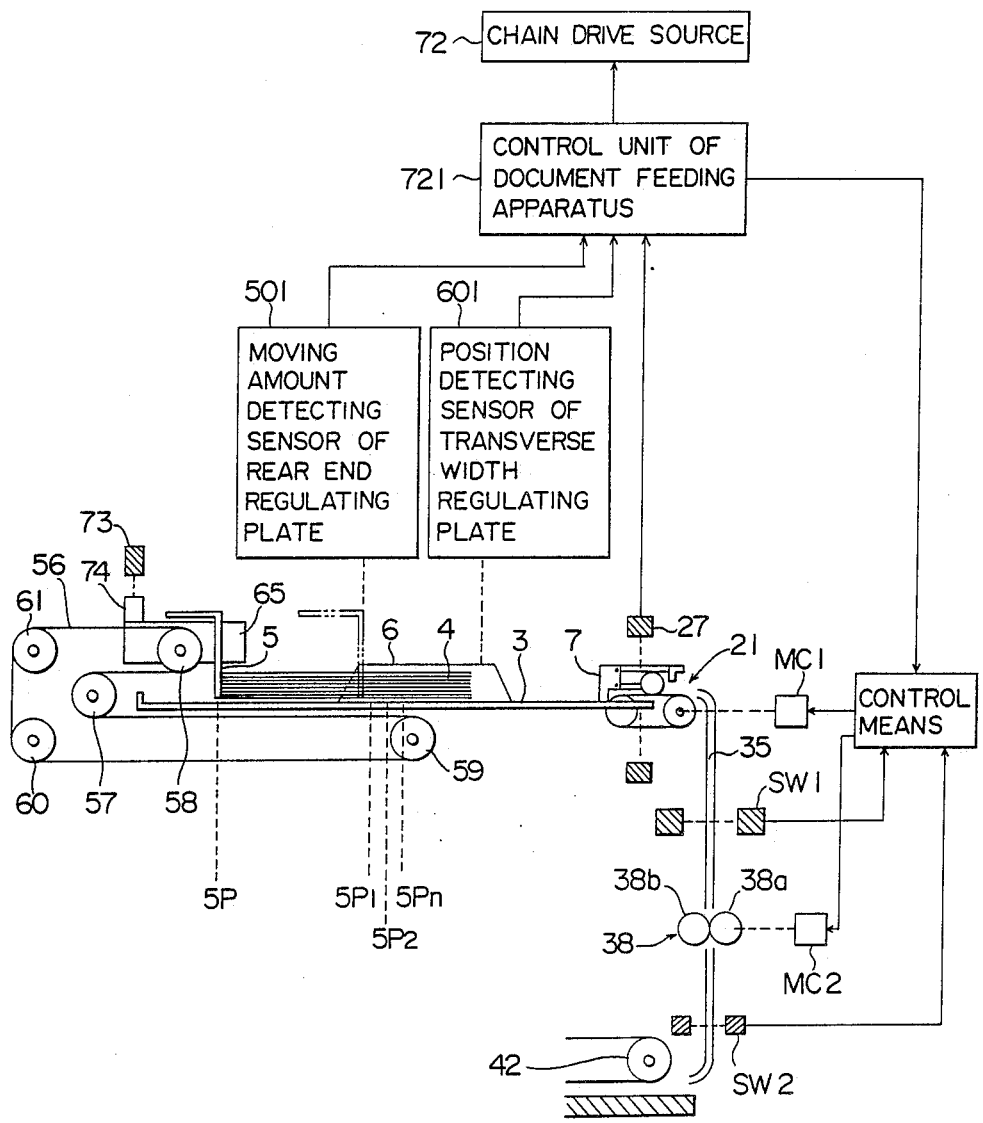
FIG. 2 is an explanatory view showing a control system.

In FIG. 1, reference numeral 1 designates a reproducing machine. Numeral 2 designates a document feeding apparatus. This document feeding apparatus 2 is equipped with a document stacker 3 having its front portion rising upward. On this document stacker there are mounted a rear end regulating member 5, by which are regulated the rear ends of documents 4 when the latter are to be set, and transverse width regulating plates for regulating the widths of the documents 4. The rear end regulating member 5 has such a function that the leading end of the document 4 stacked on the stacker 3 is pushed out to a detecting position (fixed position) of a stack sensor 27. The moving amount of the rear end regulating member 5 differs according to the length of the document, so that the length of the document can be detected by detecting the moving amount of the rear end regulating member 5 by a moving amount detecting sensor 501, as shown in FIG. 2. These transverse width regulating plates are in meshing engagement, at the lower side of the document stacker 3, with racks 6b and 6b' which can transversely slide alternately across a pinion gear 6a so that they can move symmetrically with respect to the center. The transverse size of the documents can be read out by detecting the position of the regulating plates by a position detecting sensor 601, as shown in FIG. 2, because regulating plates are moved by hand so as to accord with the transverse width of the document.

Reference numeral 7 designates a gate member which takes an upper position, when the documents 4 pushed forward by the action of the aforementioned rear end regulating member 5, and which is moved downward onto the documents 4 by its own weight or a spring in response to a signal from said stack sensor 27 when the leading ends of the documents reach the detection position of the stack sensor 27. The gate member 7 functions to hold the documents 4 to be fed by its own weight and to abut against the leading ends of the documents, which have made one circulation through a processing unit 8 and returned onto the document stacker 3, as will be described hereinafter, thereby to arrange the leading ends for a subsequent feed and to discriminate the re-stacked documents from the documents being fed.

Reference numeral 20 designates a push-out belt for pushing out the documents from the predetermined position to the paper feed position. Numeral 21 designates a paper feeding means for feeding out the documents in the paper feed position with the lowermost one first. Numeral 38 designates a second document feeding means provided in a path 35 communicating said first document feeding means with said processing unit 8. Between said first document feeding means 21 and said second document feeding means 28, a document detecting sensor SW1 which is turned on when the leading end of the document is passed through it and turned off when the trailing end of the document is passed through it is provided. Between said second document feeding means 38 and said processing unit 8 a synchronous sensor SW2 is provided adjacent to the second document feeding means 38, as shown in FIG. 2.

Said first document feeding means 21 consists of a drive shaft 23 connected to a main motor 100 through an electromagnetic clutch MC1, a document feeding belt 21' which is made to run under tension between said drive shaft 23 and a driven shaft 23', and a separating roller 22 which is in sliding contact with an upper surface of said belt 21' in a non-rotary state. The upper surface of said belt 21' is raised slightly from a rib of the document stacker 3. Said second document feeding means 38 consists of a drive roller 38a and a press roller 38b connected through an electromagnetic clutch MC2 to the main motor 100 drivingly connected to said first document feeding means 21.

Said electromagnetic clutches MC1 and MC2 are controlled by signals from a control means 201 mounted in the reproducing machine 1. The control means 201 controls both electromagnetic clutches MC1 and MC2 to turn on after the leading end of the document is inserted into a press contact point (a) formed between the document feeding belt 21' and the separating roller 22 by the operation of the push-out belt 20 or after a signal for indicating such a state that the document has been returned through the processing unit 8 to the document stacker 3 is received by the control unit 201. Thus, a sheet of documents at the lower most layer is fed by the first document feeding means 21 and the leading end of the document actuates the sensor SW1. After an ON signal of said sensor SW1 is received by the control unit 201 and a predetermined time has lapsed therefrom (before the leading end of the document passed through the second document feeding means 38 reaches the synchronous sensor SW2), both electromagnetic clutches MC1 and MC2 are turned off. Thus, the first and second document feeding means 21 and 38 are stopped and after a predetermined time has lapsed from said stop only the electromagnetic clutch MC2 is turned on to operate again said second document feeding means 38. Specifically, the document fed by the first document feeding means 21 is stopped temporarily before it reaches the synchronizing sensor while it is nipped by the second document feeding means 38 and then fed by the same. When the trailing end of the document actuates the sensor SW1 and an OFF signal of the sensor SW1 is received by the control unit 201, the electromagnetic clutch MC1 is turned on to operate again the first document feeding means 21.

Reference numeral 33 designates a suction box which is disposed to surround each of the aforementioned push-out belts 20 from the lower side of the document stacker 3. The suction box 33 is enabled by the sucking action of its suction fan 34 to such the lowermost one sheet of the documents through the clearance between the aforementioned aperture 32 and the push-out belt 20 and through the belt holes so that the pushing-out force of the push-out belt 20 may be effectively exhibited.

Numeral 35 designates a forward passage for guiding the documents onto the platen glass plate 36 of the reproducing machine 1 acting as the processing unit 8. Numeral 37 designates a turning passage for turning the documents once fed onto said platen glass plate 36 before or after the exposure. This turning passage 37 is provided so as to turn two-sided documents so that one side of the document facing the upper surface of the document stacker is faced to an upper plane of the platen glass plate 36 and to turn again the documents when the documents thus turned and exposed are to be returned to the document stacker 3. Thus, the turning passage 37 merges into the upper portion of the aforementioned forward passage 35 after it has drawn an upward loop from the plane of the aforementioned platen glass plate 36.

Numerals 39 and 40 designate conveyor rollers which are disposed midway of the aforementioned turning passage 37. These conveyor rollers 39 and 40 are so connected to the main motor 100 through one-way clutch means that they can rotate in the same feeding direction at all times.

Numeral 41 designates a conveyor belt for conveying the documents forward and backward on the upper surface of the platen glass plate 36. This conveyor belt 41 is made to run under tension between a first roller 42 connected at the feed side to the main motor 100 through forward backward switching means 101 and a second roller 43 at the discharge side. A tension roller 44 is forced into contact with the upper belt surface near the first roller 42, and the lower belt surface is held in sliding contact with the platen glass plate 36 by a plurality of holding rollers 45.

Reference numeral 50 designates a document stopper which is disposed at the end portion of the platen glass plate 36 at the discharge side. The document stopper 50 thus constructed sinks from the platen glass plate 36 in the RDF mode, i.e., in the case the documents are exposed, while being conveyed at a synchronous exposure speed over the platen glass plate 36 by the conveyor belt 41, to form an image on a drum with an exposing optical system 54 being fixed, which is enabled to have its modes selected between a fixed mode positioned just below the platen glass plate 36 and a moving mode. In the ADF or SDF mode, on the other hand, in the case the documents are halted in the exposure position on the platen glass plate 36 so that they may be exposed to form an image on the drum with the optical system 54 being moved, the document stopper 50 extends above the platen glass plate 36.

Numeral 55 designates a paper discharge guide plate which extends to the exit of the platen glass plate 36, and numeral 56 designates a discharge belt. This discharge belt 56 is so made to run under tension on a set of rollers; a drive roller 57 borne just behind the document stacker 3 and connected to the main motor 100 through one-way control means; upper and lower end rollers 58 and 59 borne to move horizontally along the upper and lower surfaces of the document stacker 3; and auxiliary rollers 60 and 61 borne in the vicinity of the aforementioned paper discharge guide plate 55, so as to surround the rear side of the document stacker 3 in the shape of letter "C". The discharge belt 56 thus constructed is enabled to convey in the discharging direction the documents which are fed out of the conveyor belt 41 as the aforementioned drive roller 57 rotates in a predetermined direction.

The moving means of the paper discharging belt 56 is constructed as the movement control means of the aforementioned rear end regulating member 5 against which the documents have their rear ends abutting when they are to be set on their stacker 3.

Reference numerals 75 and 76 designate holding rollers which are disposed in positions corresponding to the aforementioned auxiliary rollers 60 and 61 and in abutment against the paper discharging belt 56 from the outside of the paper discharging guide plate 55 through the aperture. Numeral 77 designates a ceiling guide plate which has its base end hinged to the upper portions of the rear ends of the two side frames 62 of the document feeding apparatus 2. Numeral 78 designates a discharge aperture guide plate which is disposed to face the upper moving members 65 bearing the aforementioned upper end rollers 58 at a small clearance from the upper surface of the upper belt portion of the paper discharging belt 56. Numeral 79 designates a holding roller which is in abutment against the paper discharging belt 56 through the aperture from the upper surface of said paper discharging aperture guide plate 78.

Numeral 82 designates a switching pawl which is disposed midway of the aforementioned paper discharging guide plate 55 for switching the processed documents between a circulating discharge passage A directed toward the document stacker 3 and an external discharge passage B directed to a paper tray 83 outside of the machine. This switching pawl 82 is made movable to open the external discharge passage B, when the aforementioned rear end regulating member 5 is returned to the home position, and the circulating discharge passage A when the rear end regulating member 5 is not in the home position. This switching action may be accomplished by using either a solenoid or another suitable mechanical means.

Reference numeral 84 designates a manual insertion plate which has its base end hinged to the upper surface of the leading end of the aforementioned ceiling guide plate 77. This manual insertion plate 84 is usually folded on the upper surface of the ceiling guide plate 77, as shown in FIG. 1. When the documents are fed one by one in the SDF mode, the manual insertion plate 84 can be extended on its hinged portion to cover the document stacker 3. Upon this extension, the leading end of the manual insertion plate 84 approaches the paper feeding belt 21. Moreover, the manual insertion plate 84 is so marked on its extended upper surface as to indicate the size of the documents to be fed so that the user can acknowledge the document insertion position. When the manual insertion plate 84 is extended, still moreover, a not-shown SDF actuator may advantageously be turned on.

Figure 3:
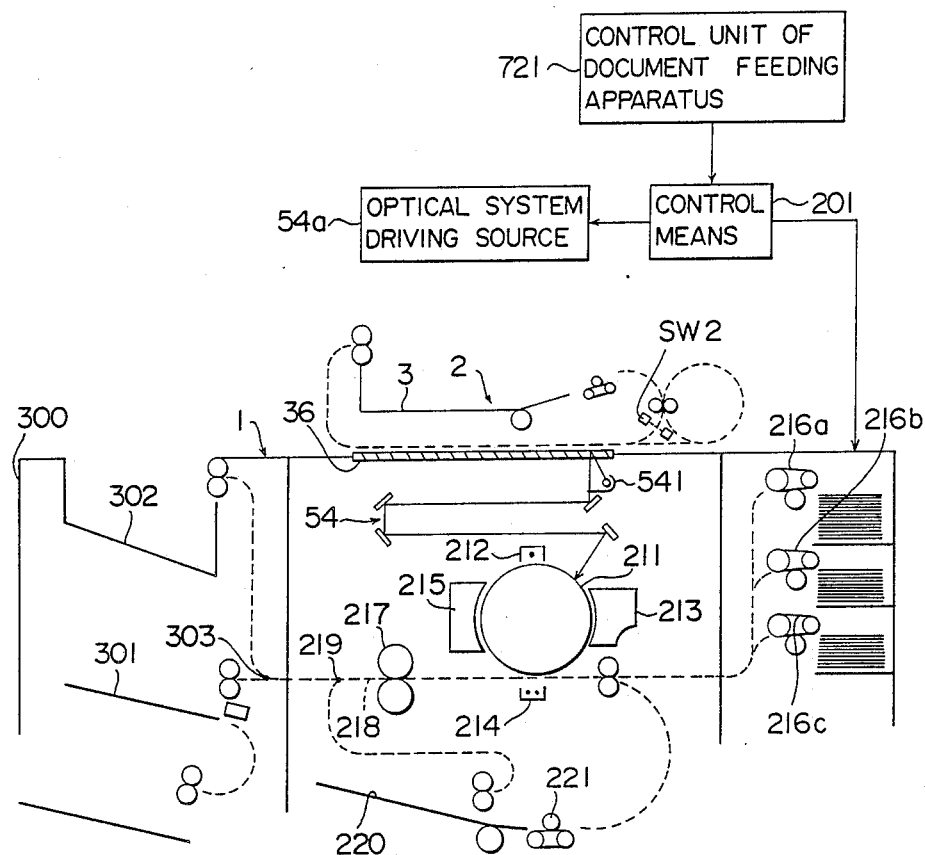
FIG. 3 is an explanatory view showing the reproducing machine and a control system thereof.

In said reproducing machine 1, as shown in FIG. 3, a document fed from the document stacker 3 of the document feeding apparatus 2 to the platen glass plate 36 through the forward passage 35 is exposed with a light from a light source 541 of the exposure optical system 54 and a reflected light is applied on a photosensitive drum 211 through mirrors. Around the photosensitive drum 211 are arranged a charging device 212, developing devices 213, transfer device 214, cleaning box 215, paper feeding devices 216a-216c for feeding a copy paper between the photosensitive drum 211 and the transfer device 214, and fixing device 217 for fixing the toner image after the transfer. In case of one-side copying operation, a copy paper on which a document information has been transferred is fed to a final processing unit 300 through the fixing device 217. If a copying operation of the other side of the copy paper is required in this case (two-side copying) after the one-side copying operation has been completed, the copy paper is fed from a branch point 219 provided on the midway of a passage 218 going toward said final processing unit 300 to a copy paper stacker 220 mounted below the photosensitive drum 211 so that a surface to be copied faces upwards. The one-side copied paper on the copy paper stacker 220 is fed from the bottom thereof by a paper feeding device 221 to the transfer device 214 in such a way that the other side of the paper which has not yet been copied faces the photosensitive drum 211 and then fed to the final processing unit 300 through the fixing device 217 after the two-side copying operation has been finished. The final processing unit 300 comprises a lower stage tray 301 having a punching means for forming staple holes for filing on the copy sheets and a stapling means using a stapler, and an upper stage tray or offset tray 302 which has no such means. In case that a final processing mode is selected the copy sheets are stored in said lower stage tray 301 and in case that the final processing mode is not selected they are stored in the upper stage tray 302 through a branch point 303. Said upper stage tray 302 has means for stacking a predetermined amount of copy sheets for each page so as to deviate from one another so that the following sorting operation becomes easy.

In the embodiment thus far described, the documents are set in the laminated state by directing the copy surfaces upward and in the order of pages and by bringing their rear ends into abutment against the rear end regulating member 5 in the home position. Then, the widthwise direction is regulated by the transverse width regulating plates. After this, the number of copies is inputted, and the copy button is depressed. The moving position of the transverse width regulating plate is detected by the position detecting sensor 601 and a detection signal is applied to the control unit 721 of the document feeding apparatus.

When the copy button is turned on, the gate driving source 17 for driving the gate member 7 is energized to lift the gate member 7 to a position, in which the laminated documents can sufficiently advance below the gate member 7.

Next, the rear end regulating plate 5 is advanced while pushing out the rear end of the documents. When the leading end of the documents having passed below the gate member 7 is detected by the stack sensor 27, so that a control unit 721 interrupts a chain driving source 72. The document size is detected by the moving amount detecting sensor 501 and the detection signal is applied on the control unit 721 of the document feeding apparatus 2 and the control unit 201 of the reproducing machine 1.

When the push-out belt 20 is run, the documents are pushed out toward the press contact point (a) formed between the document feeding belt 21' and the separating roller 22. Since, at this time, the document feeding belt 21' is stationary because the electromagnetic clutch MC1 is turned off, the documents are pushed out advance in the form of a wedge into the press contact point (a) formed between the document feeding belt 21' and the separating roller 22.

Figure 4:
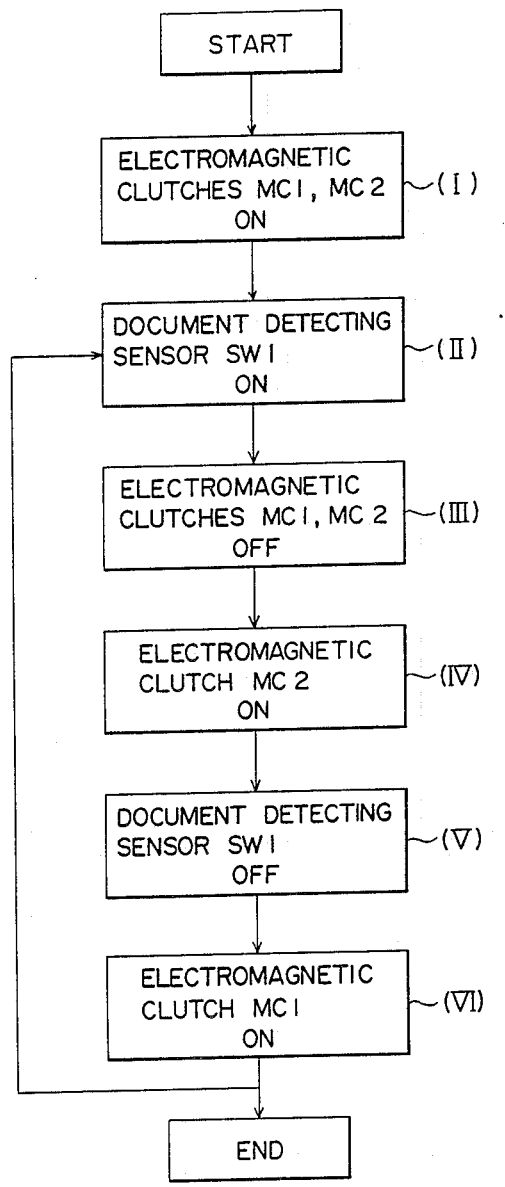
FIG. 4 is a flow chart of the control system.
Figure 5:
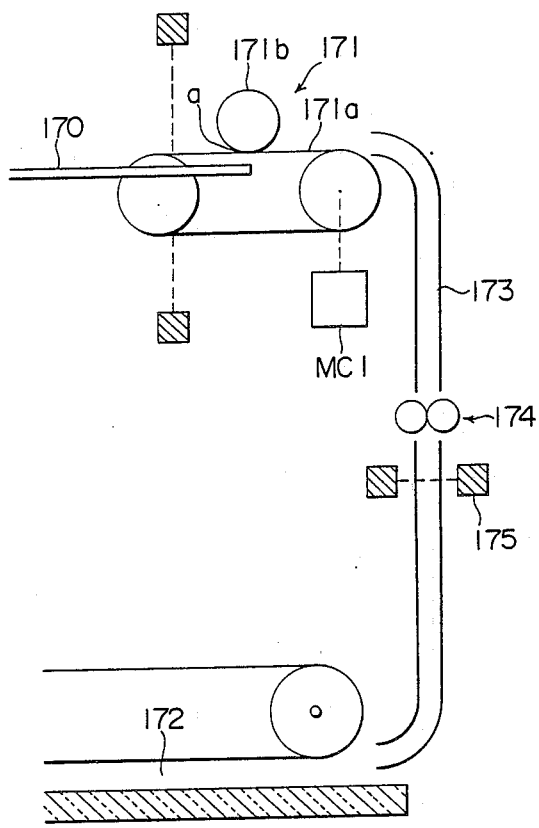
FIG. 5 is an explanatory view of a conventional document feeding apparatus.

Next, the control unit 201 controls as shown in FIG. 4. Specifically, both electromagnetic clutches MC1 and MC2 are turned on (step I) to run the document feeding belt 21' and rotate the conveyor roller 38 of the second document feeding means 38. Since, at this time, the separating roller 22 contacting the document feeding belt 21' is held irrotational, the lowermost one of the documents is fed out by the document feeding belt 21' one by one. The aforementioned push-out belt 20 is synchronously started to the paper feeding belt 21'.

When the leading end of the document fed by the first document feeding means 21 actuates the document detecting sensor SW1 disposed midway of the forward passage 35 (step II), the control unit 201 controls the electromagnetic clutches MC1 and MC2 to turn off after a predetermined time has lapsed from the actuation of the sensor SW1 (step III). The document passed through the second document feeding means 38 is stopped before it reaches the synchronous sensor SW2, at which the trailing end of the document has not yet passed through the press contact point (a) formed between the document feeding belt 21' and the separating roller 22. After a predetermined time has lapsed from the stop of the document, the control unit 201 controls only the electromagnetic clutch MC2 to turn on (step IV). Thus, the second document feeding means 38 is operated, so that the document is conveyed at the synchronous exposure rate on the platen glass plate 36 while sliding between the document feeding belt and the separating roller and received by the conveyor belt 41.

The exposure is initiated by the optical system 54 after a predetermined time has lapsed from the actuation of the synchronous sensor SW2 by the leading end of the document, so that an image corresponding to a document information thus obtained is formed on the photosensitive drum and at the same timing a copy paper is supplied on the transfer device 214 from the paper feeding device.

When the trailing end of the document fed on said platen glass plate 36 actuates the document detecting sensor SW1 to turn off as mentioned above (step V) and the control unit 201 receives an off signal, the electromagnetic clutch MC1 is turned on (step VI), so that the first document feeding means 21 is operated again to forward next sheet of documents.

When the leading end of the document actuates the document detecting sensor SW1, the mode returns to the step II and after a predetermined time has lapsed therefrom the control unit 201 controls both electromagnetic clutches MC1, MC2 to turn off, so that the document is stopped temporarily before the leading end of the document passed through the second document feeding means 38 reaches the synchronous sensor SW2 and then conveyed on the platen glass plate 36.

Thus, the document after exposure processed is moved along the paper discharge guide plate 55 and discharged to the document stacker 3 by the paper discharging roller 56. The document feeding is controlled on the basis of a signal from the sensor SW2.

The documents discharged on the document stacker 3 are stacked again after the front and rear ends thereof are regulated by the gate member 7 and the rear end regulating plate 5, and the transverse width thereof is regulated by the transverse width regulating plates. Accordingly, the paper feeding property in the next paper feeding can be enhanced.

Said feeding operation is repeated until all documents below the gate member are fed while varying the synchronous feeding speed and the feed timing specified by the copy size and copy magnification at every copying operation. When the lack of the document below the gate member is detected by the stack sensor 27 and the discharge of final document is detected by the paper discharging sensor 86, the gate member 7 is elevated again and the stacked documents are fed out by the rear end regulating plate 5. The above operation is repeated until a predetermined number of copying is completed. When the predetermined number of copying is completed and it is detected by said paper discharging sensor 86, the rear end regulating plate 5 is returned to the home position for the next operation.

The operations described above provides the case in which one-sided documents are subjected to the one-side copying operation in the RDF mode. As a result, the document stopper 50 disposed at the end portion of the discharge side of the platen glass plate 36 of the reproducing machine 1 sinks below the platen glass plate 36, and the exposing optical system 54 is in the fixed mode at a predetermined position. If the mode is changed to the ADF mode, the exposing optical system 54 is accordingly changed to the moving mode, in which the document stopper 50 disposed at the end portion of the discharge side of the platen glass plate 36 appears from the surface of the platen glass plate to halt the documents at its position (i.e., the exposure position) so that a set number of copies are copied by moving the exposing optical system 54. After this, the documents are conveyed in the discharging direction by the restart of the conveyor belt 41 and the retraction of the document stopper 50, until they are discharged through the switching pawl 82 disposed midway of the paper discharge guide plate 55 from the external discharge aperture to the discharge tray 83.

On the other hand, let the case be considered, in which one-sided documents are subjected to a two-side copying operation. In this case, the documents set on their stacker are first circulated once while being unexposed so that the number of the documents may be counted and judged whether they are even or odd. This counting operation is accomplished by operating a counter (although not shown) through the sensor 85 which is disposed midway of the forward passage 35. If the number is four, for example, the last (fourth) page of the documents, which have been fed to the platen glass plate 36 from the document feeding apparatus 2, is copied at the reproducing machine body 1 to one side of transfer paper. Then, the documents are returned to their stacker 3, and the transfer paper having its one side copied is stacked with its copied side facing upward on a transfer paper stacker (although not shown) disposed below the photosensitive drum (although not shown). The transfer paper having its one side copied is fed, synchronously with the document of the third page fed from the document feeding apparatus 2 onto the platen glass plate, to the photosensitive drum from its stacker with its uncopied side facing upward, until the third page is copied and discharged. This is repeated likewise for the second and first pages. If the documents have three pages, the last third page is copied and discharged instantly. The transfer paper having copied the second page is fed to the transfer paper stacker, from which is fed the first page until it is copied and discharged.

In the case two-sided documents are subjected to a one-side copying operation, on the other hand, the documents sent out from their stacker are fed through the forward passage 35 onto the platen glass plate 36. Then, the last page is on the top of the documents on the platen glass plate 36. (1) The document once fed onto the platen glass plate 36 is halted at the timing when its trailing end rides on the glass plate. (2) The conveyor belt 41 is reversed to feed the document to the turning passage 37 thereby to turn the document upside down. The documents are exposed on the platen glass plate 36 by the fixing optical system 54 with the last page being in the lowermost position. In synchronism with this, the transfer paper fed from the paper feeding unit of the reproducing machine body 1 is copied and discharged as it is. (3) The exposed documents are fed again by reversing the conveyor belt 41 so that their page order may be corrected through the turning passage 37. The documents are exposed on the platen glass plate 36 with their other pages facing downward and are copied to the subsequent transfer paper fed from the paper feeding unit of the reproducing machine body 1. After this, the documents are returned to their stacker 3. The one-side copying operations of the two-sided documents are completed by repeating the above-specified operations (1) to (3).

In the case the two-sided documents are subjected to a two-side copying operation, on the other hand, only the even-numbered pages are first copied. Specifically, after the documents have been fed to the platen glass plate, they are turned through the turning passage 37 so that each of the even pages is exposed, while being directed downward, and copied to one-side of transfer paper. After this, the documents are returned again through the turning passage 37 to their stacker 3, while being left unexposed, whereas the one-side copied transfer paper is stacked on its stacker in the reproducing machine body 1. After all the even-numbered pages have been thus copied, the copying operations of odd-numbered pages are started. For these copying operations of the odd-numbered pages, the turning operations of the documents are not required, and the transfer paper is sent out from its stacker so that the other sides of the one-side copied transfer paper is copied. Specifically, the third page is copied on the other side of the transfer paper copied with the fourth page, and the first page is copied on the other side of the transfer paper with the second page.

As has been explained, the present invention is characterized by a document feeding apparatus comprising a first document feeding means for feeding documents one by one from a document stacker, a second document feeding means provided in a path communicating said first document feeding means with a processing unit, and a synchronous sensor provided adjacent to said second document feeding means, wherein document stopping means for stopping temporarily the movement of the document before the leading end of said document fed from said second document feeding means reaches the synchronous sensor is provided. According to the invention, even if there is any problem in the document feeding power of the first document feeding means, the document is then fed by the second document feeding means which has a stable document feeding power, so that a duration of time between the detection of the leading end of the document by the synchronous sensor and the initiation of the exposure is prevented from being fluctuated.

What is claimed is:

1. A document feeding apparatus comprising:
   document stacking means for receiving a stack of documents, each document having a leading edge and a trailing edge;
   copying means for copying the documents;
   first document feeding means for feeding documents from the document stacker along a desired path;
   second document feeding means disposed along the desired path between the first document feeding means and the copying means for feeding the documents to the copying means;
   first sensing means disposed along the desired path between the first document feeding means and the second document feeding means for detecting the leading edge of a document and generating a first document signal in response thereto;
   second sensing means disposed along the path between the second document feeding means and the copying means for detecting the leading edge of a document and generating a second document signal in response thereto; and
   control means for stopping the movement of the document along the desired path for a first predetermined period of time in response to the first document detection signal from the first sensing means before the leading edge of the document fed from the second document feeding means reaches the second sensing means and energizing the second document feeding means after a predetermined period of time to feed the document to the copying means and for energizing the copying means in response to the second document detection signal after a second predetermined period of time.

2. The document feeding apparatus according to claim 1, wherein said first document feeding means includes:

a feeding belt having an upper surface for contacting the document to be fed connected to a drive source through an electromagnetic clutch; and a separating roller disposed in sliding contact with the upper surface of said feeding belt.

3. The document feeding apparatus according to claim 1 or 2, wherein said second document feeding means consists of a drive roller connected to a drive source through an electromagnetic clutch, and a driven roller which is in press contact with said drive roller.

4. The document feeding apparatus according to claim 1, wherein said document stopping means comprises control means for stopping the operation of said first and second document feeding means after a predetermined time has lapsed from a time when a sensor provided between said first and second document feeding means generates an on signal, for starting the operation of the stopped second document feeding means after a predetermined time has lapsed from the stop thereof, and for starting the operation of the stopped first document feeding means when said sensor generates an off signal.

5. The document feeding apparatus according to claim 4, wherein the movement of the document is stopped temporarily at a position in the upstream of said synchronous sensor to stop while it is nipped by said second document feeding means.

6. The document feeding apparatus according to claim 1, wherein the document feeding is controlled on the basis of a signal from said first sensing means.

* * * * *